United States Patent [19]

Kawaguchi

[11] Patent Number: 4,618,892
[45] Date of Patent: Oct. 21, 1986

[54] DYNAMIC SHADING COMPENSATION FOR IR TRACKING SYSTEM

[75] Inventor: Frank M. Kawaguchi, Fountain Valley, Calif.

[73] Assignee: Northrop Corporation, Hawthorne, Calif.

[21] Appl. No.: 715,441

[22] Filed: Mar. 25, 1985

[51] Int. Cl.$^4$ .............................................. H04N 5/14
[52] U.S. Cl. .................... 358/163; 358/113; 358/211; 250/330; 250/338
[58] Field of Search ............... 358/163, 113, 206, 208, 358/209, 211, 213; 250/330, 334, 338, 346, 347, 352

[56] References Cited

U.S. PATENT DOCUMENTS 4,118,732 10/1978 Ichijima et al. ...................... 358/163
4,538,181 8/1985 Taylor .................................. 358/206

Primary Examiner—James J. Groody
Assistant Examiner—Michael D. Parker
Attorney, Agent, or Firm—Terry J. Anderson

[57] ABSTRACT

A circuit which compensates for display shading in a FLIR infrared tracking system utilizes (1) a triangular signal corresponding to scanner motion and (2) a parabolic signal derived as the integral of the triangular signal. By processing both these signals in a multiplier which is biased by a gain signal from the system postamps, a dynamic compensation signal is derived which serves as a level input signal to the post amps. This signal diminishes the effect of variable shading due to two sources, namely postamps and the temperature difference between a scene and the aperture stop of the system. The summation of the triangular and parabolic signals is added to the level input signal thus compensating for the fixed shading due to vidicon and CRT display system components.

9 Claims, 3 Drawing Figures

DYNAMIC SHADING COMPENSATION FOR IR TRACKING SYSTEM

FIELD OF THE INVENTION

The present invention relates to infrared tracking systems and more particularly to display shading compensation for such systems.

BACKGROUND OF THE INVENTION

A critical parameter of a high performance infrared tracking system of the FLIR type is uniformity in brightness of the displayed video. The term used for non-uniformity is commonly called shading. Sources of shading in a common module FLIR system are vidicon camera, video CRT display unit and a fundamental physical characteristic of optical systems called the cosine to the fourth power effect. Another effect which is unique to each system design is a thermal gradient across the aperture stop in front of the FLIR scanner.

Typical values of shading for vidicon camera shading is 15 to 25 percent on good quality vidicons. Ten to 15 percent shading for display systems is typical. For a plus or minus 6.5 degree scan angle, the cosine to the fourth power is 0.975 which yields a center to edge difference of 2.5 percent. For example, for a condition where the scene to system aperture temperature difference is 40 degrees centigrade and the maximum system intensity transfer is 1.5 degrees centigrade, a shading of 67 percent results. The magnitude of cosine effect alone exceeds a typical shading requirement by a factor of two to three.

Shading correction circuits using digital techniques can be used. However, these approaches are relatively complex and require extensive hardware. The FLIR dynamic shading compensation circuit of the present invention is an analog approach and requires minimum hardware which interfaces with the existing common module electronics.

BRIEF DESCRIPTION OF THE INVENTION

The shading with which the present invention is concerned is of two types:

1. Fixed shading which is considered invariant with scene change and FLIR post amplifier gain and level setting. The sources of this shading are the vidicon camera and CRT display.

2. Variable shading which is dependent on the sources on the optical side of the detector. These include the cosine effect and the thermal gradient across the afocal aperture stop. These sources, as observed at the display, are dependent on the FLIR post amplifier gain setting by the operator. The cosine effect is also dependent on the difference in the aperture stop and scene temperature.

Measurement data of the brightness across the display unit and observation of a television raster line of video at the input to the display unit have established two major waveform components, a parabolic shape and a left to right or right to left ramp function. The approach taken in the present invention is to add parabolic and triangular signals with appropriate signs and magnitudes resulting in a FLIR level control signal which minimizes shading.

The advantages of the present inventive design include the following:

1. Standard quality electronic components may be incorporated in a relatively small package for accomplishing the desired objectives.

2. The present circuitry presents an interface which is compatible with the existing FLIR common module, without modification.

3. A compensation signal generated by the present invention is synchronized with the FLIR scanner position, therefore angular shift in the scanner does not affect compensation.

4. Automatic correction with IR contrast polarity change is possible.

5. Automatic compensation for change of the FLIR post-amplifier gain is attained.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
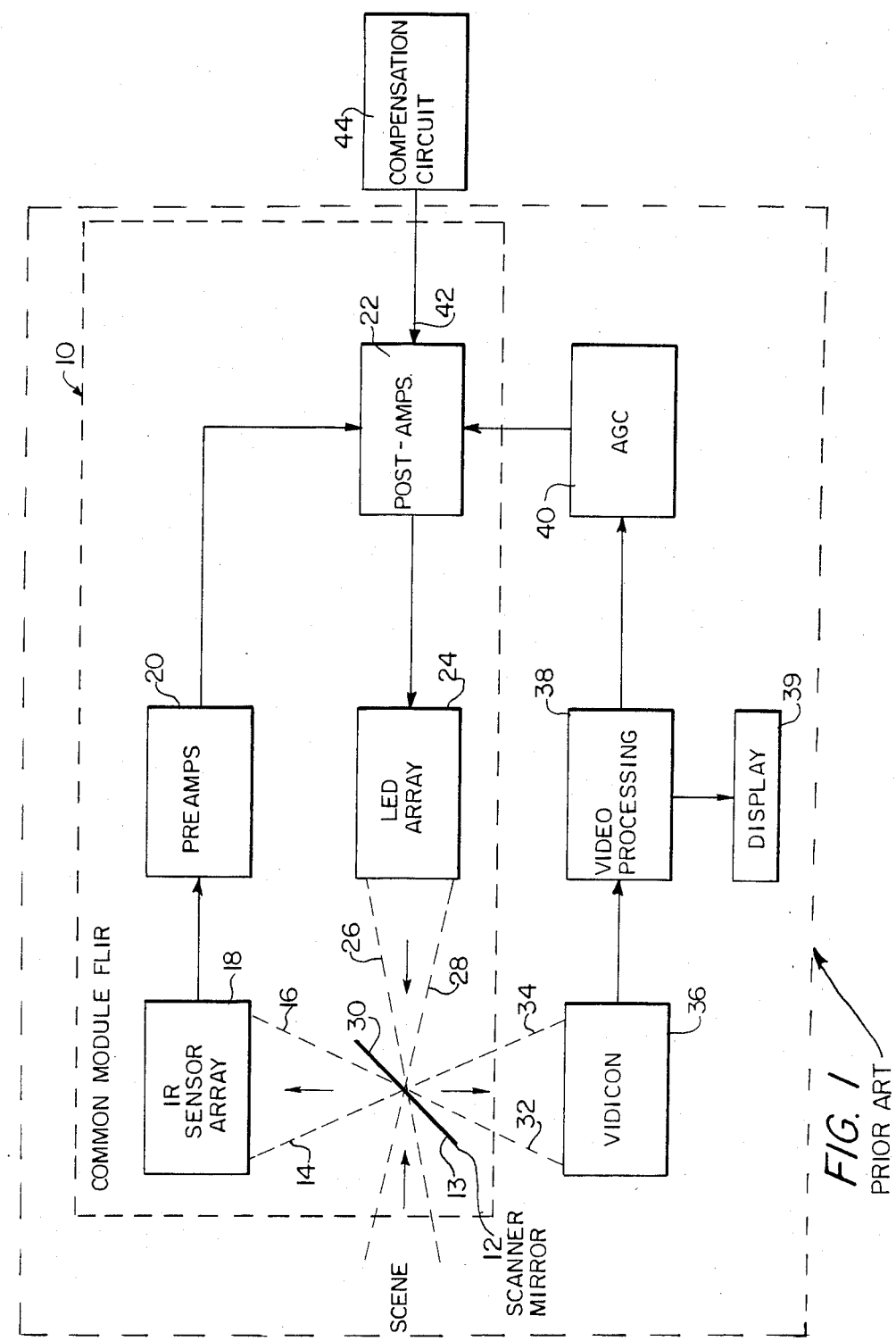
FIG. 1 is a basic block diagram of a FLIR system to which the present inventive compensation circuit is connected.

A conventional IR tracking system is commonly known as a FLIR system. This type of system is typically fabricated with a common module which incorporates a number of IR electronic components. Such a module is generally indicated by reference numeral 10 in FIG. 1. The module includes a scanner mirror 12 which is driven between two angular positions indicated by reference numerals 14 and 16. A reflected scene impinges upon an IR sensor array 18 which converts the infrared sensed scene to an electronic signal which is amplified by preamps 20. An electrical light feedback circuit is created when the signal from preamps 20 is fed to postamps 22 which further amplify the electrical signal for driving an array of LEDs 24. The array then simulates the IR detected scene and projects an LED image, represented by rays 26 and 28, to a back surface 30 of scanner mirror 12. The LED image is reflected from mirror 12 to a vidicon 36, as represented by reflection rays 32 and 34. Thus far described, the IR detected scene has been translated to an LED image and then converted to a vidicon electrical output. This output undergoes processing by a video processor 38 having a first indicated output containing composite video which is displayed on a CRT. The second output of the video processor 38 is fed to an automatic gain circuit 40 which has its output connected to a gain control input of the postamps 22.

In order to achieve the dynamic shading compensation of the present invention, a compensation circuit 44, to be discussed in greater detail hereinafter, generates an output connected to a level control input terminal 42 of the postamps 22.

Figure 2:
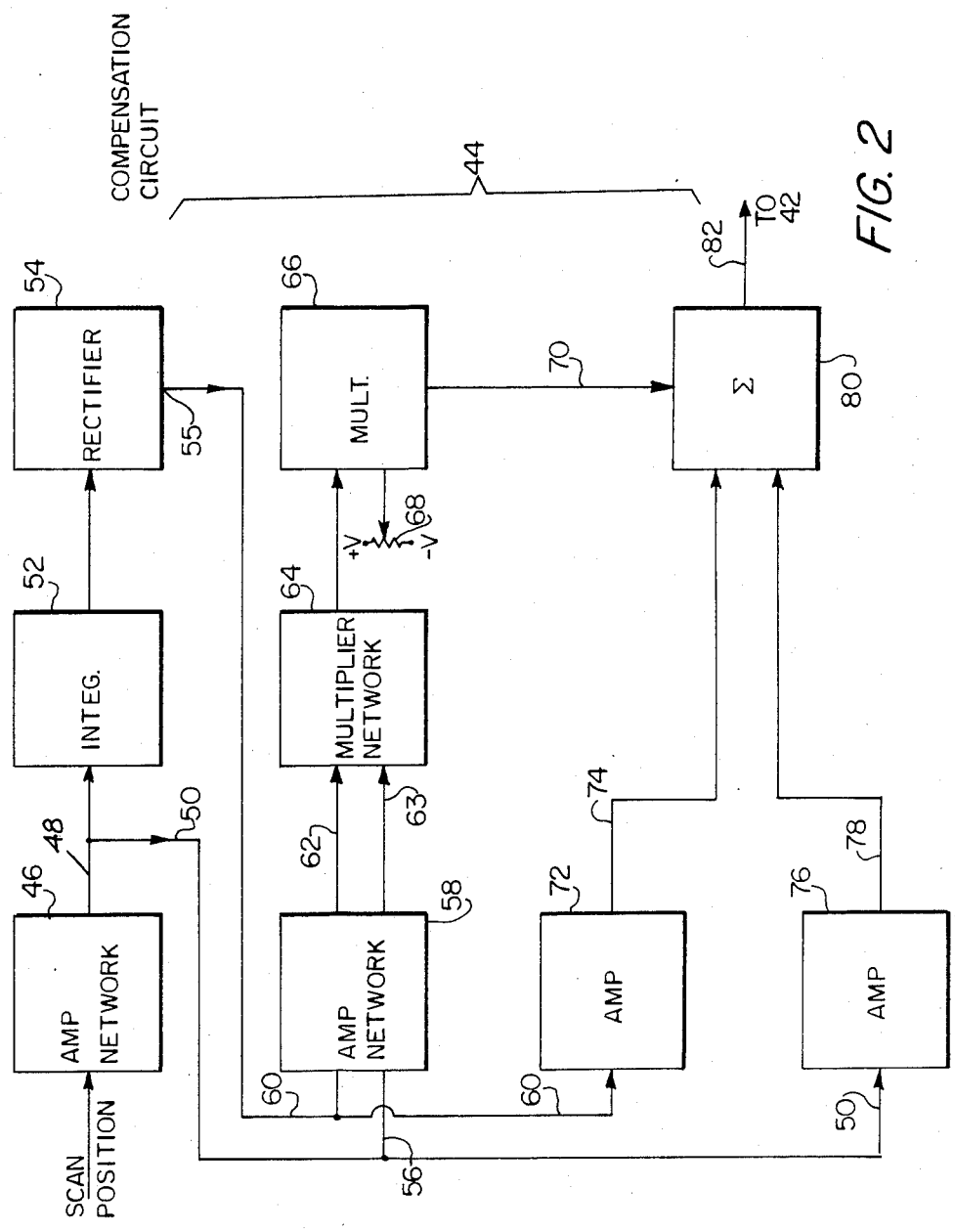
FIG. 2 is a block diagram of the present invention.

FIG. 2 illustrates the inventive compensation circuit in block diagram form. A triangular function signal is derived from the drive (not shown) of the prior art scanner mirror 12 (FIG. 1). This signal represents the scan position signal and serves as an input to amp network 46. The output 48 of this network develops an amplified triangular signal which serves as a first primary compensating signal transferred along line 50 to components which will be discussed hereinafter. The triangular signal is also delivered from output 48 to integrator 52 which translates the triangular signal to a parabolic signal which then undergoes full wave rectification in rectifier 54. The rectified parabolic signal is transferred, via line 55, to the remainder of the compensation circuit where it is added to the triangular signal as will now be discussed.

A first input 56 of amp network 58 is provided with the triangular signal which undergoes amplification along with the parabolic signal which is introduced to the amp network 58 along input 60. These amplified signals are individually provided to a multiplier network 64, along respective input lines 62 and 63. The multiplier network 64 multiplies the signals to obtain a partial compensation signal which compensates for the variable shading due to the FLIR post amplifier gain setting made by an operator. A second source of variable shading, namely due to the difference in the aperture stop and scene temperature is compensated for by utilization of another multiplier 66 which operates upon the compensation signal from multiplier network 64 and an adjustable DC voltage, obtained from potentiometer 68. The setting of potentiometer 68 may be adjusted as necessary to compensate for changing differences between the temperature of the aperture stop and the scene. Thus, the output 70 from multiplier 66 represents the compensation signal component to compensate for the causes of variable shading.

In order to compensate for the sources causing fixed shading, the triangular signal is conducted, via line 132, to amp 76 where it undergoes amplification. The output from amplifier 76 is connected, along line 78, to a summing circuit 80. The parabolic signal at input 60 is amplified by amplifier 72 and connected to the summing circuit 80 via line 74. The respective triangular and parabolic signals along lines 74 and 78 compensate for the fixed shading caused by the vidicon 36 (FIG. 1) and the system CRT display 39 (FIG. 1).

The output 82 from the summing circuit 80 is connected to input terminal 42 of the common module FLIR (FIG. 1) and transmits thereto a level input signal which represents the superposition of the parabolic and triangular functions combined as discussed in connection with FIG. 2, to compensate for the fixed and variable shading inherent in this type of system.

Figure 3:
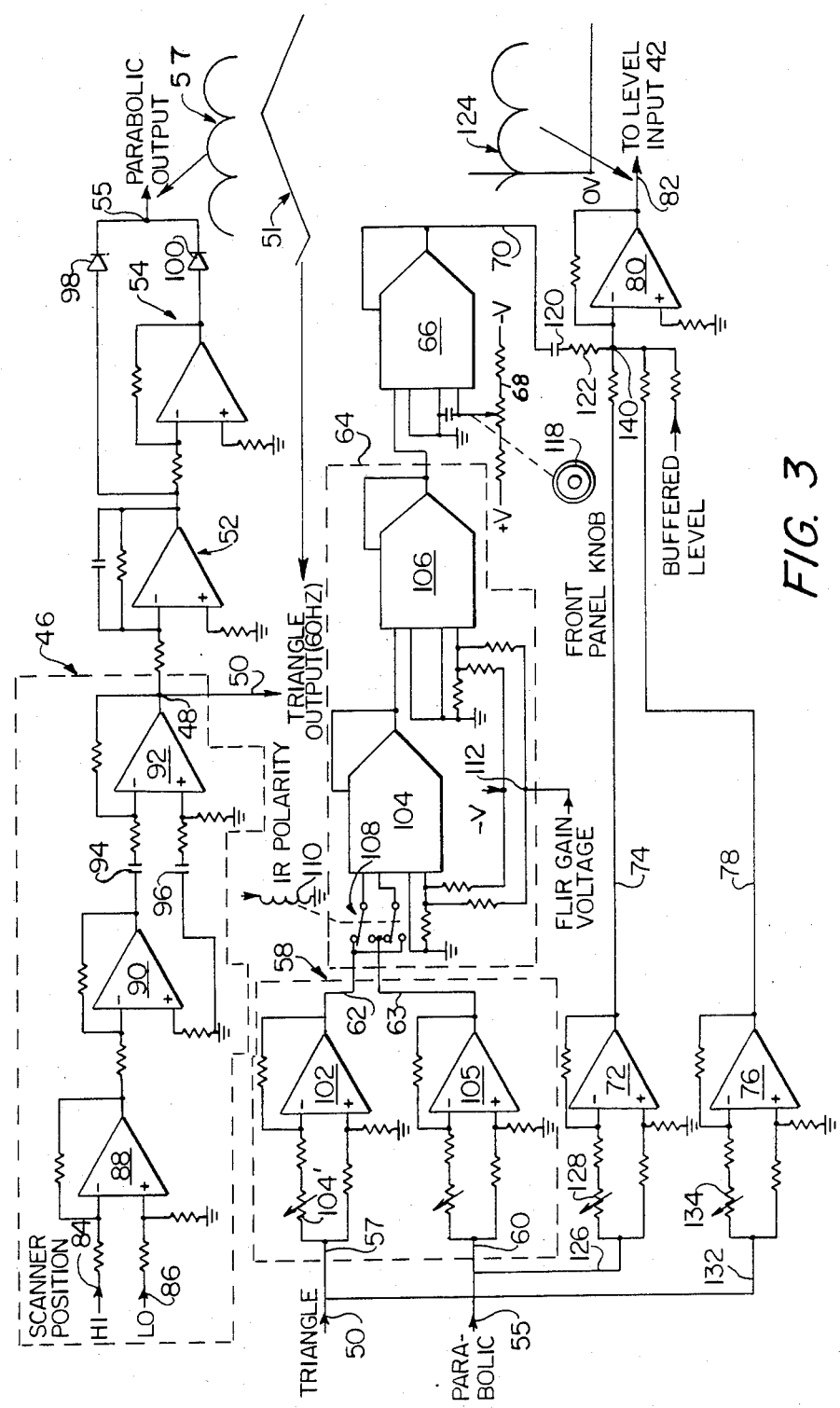
FIG. 3 is a schematic of the present compensation circuit.

FIG. 3 is a detailed schematic of the compensation circuit 44 which has just been discussed in connection with the block diagram in FIG. 2.

Referring to FIG. 3 signals representing the extreme scanner mirror angular portions 14 and 16 (FIG. 1) are represented by high and low signals which are fed, at input terminals 84 and 86, to differential amplifier 88 which is a first stage of the amp network 46 previously discussed in connection with FIG. 2. A second stage of amplification is achieved by amplifier 90, and a third amplifier stage 92 achieves further amplification of the scanner position signal after the DC components have been removed by blocking capacitors 94 and 96. Output terminal 48 of the amplifier stage 92 is connected to line 50 which carries the triangular output signal 51 indicated on FIG. 3. As previously discussed in connection with FIG. 2, the triangular signal is conveyed along line 50 to other parts of the compensation circuit which will be discussed in greater detail hereinafter. The integrator 52 generates the parabolic compensation signal which is fed to the full wave rectifier 54 having diodes 98 and 100 connected at the cathodes thereof, to output line 55 where a parabolic output signal is available which resembles the curve generally indicated by reference numeral 57 in FIG. 3. In a preferred embodiment of the invention, the frequency of the parabolic output is 120 Hz while that of the triangular signal is 60 Hz.

The triangular signal is then fed to input terminal 56 of amplifier 102 while the parabolic signal is fed to input terminal 60 of amplifier 105. Each of these latter-mentioned amplifiers has individually set gain controls that are customarily adjusted when the system is assembled. Both of these amplifiers constitute the amp network 58 discussed in connection with FIG. 2. Further, as was discussed in FIG. 2, lines 62 and 63 respectively connect the amplified triangle and parabolic signals to a multiplier network 64 which includes a first multiplier stage 104 that has dual inputs respectively connected to lines 62 and 63 through a polarity setting switch 108. A second multiplier stage 106 is employed to match the customary dual multiplier stages of postamps 22 (FIG. 1). The switch 108 is controlled by a selectably energizeable relay coil 110. If the switch 108 is positioned in a second switch position, the inputs are inverted which enables a system operator to display a white image on a black background or vice versa, depending upon personal preference. Both multiplier stages 104 and 106 are provided with an input along line 112 which is derived from the post amp 22 (FIG. 1); and, as the gain of the post amp changes, so does the gain signal on line 22 thereby enabling the circuitry of the invention to provide dynamic compensation.

As previously discussed in connection with FIG. 2, the output from the multiplier network 64 contains the parabolic and triangular signals which compensate for the variable shading due to post amplifier gain. The final multiplier 66 has as one of its inputs the output from multiplier stage 106 while a second input is connected across a DC biased potentiometer 68. By setting a knob 118 on the front panel of an associated housing, the potentiometer setting may be changed to compensate for the variable shading due to temperature difference between the aperture stop and the scene.

Amps 72 and 76, depicted in FIG. 2 are more clearly illustrated as differential amplifiers in FIG. 3 having variable gain controls 128 and 134 respectively connected to the input terminals thereof. The summing circuit 80 is illustrated as being an amplifier having the parabolic and triangular signals fed to an input thereof along lines 74 and 78, their contribution to a summation function compensating for the fixed shading effect due to the vidicon 36 and display 39 (FIG. 1). Total summation is achieved by connecting the output line 70 of multiplier 66 (variable shading compensation) through DC blocking capacitor 120 and coupling resistor 122 to junction point 140 where the parabolic and triangular signals are joined. The output line 82 of the summing circuit 80 is then connected to the level input terminal 42 of the postamps (FIG. 1) and the composite compensation signal thereat appears as generally indicated by reference numeral 124.

As will be appreciated, the described circuit achieves dynamic shading compensation which substantially reduces the shading effects inherent in FLIR systems.

It should be understood that the invention is not limited to the exact details of construction shown and described herein for obvious modifications will occur to persons skilled in the art.

I claim:

1. A circuit which compensates for display shading in an infrared tracking system, including a scanning mirror, signal post amplifiers, vidicon, and a CRT display, the circuit comprising:

amplifying means having its input connected to a signal source representative of tracking scanner position and generating a triangular signal therefrom;

integrating means connected at its input to the triangular signal for translating it to a parabolic signal;

rectifying means connected to the output of the integrating means for performing full wave rectification of the parabolic signal;

means for multiplying the triangular and rectified parabolic signals for forming a first partial compensation signal which biases the post amplifiers in a manner achieving substantial diminution of variable shading due to post amplifier gain; and means connecting the post amplifier to the multiplying means for dynamically controlling the gain of the multiplying means as a function of the post amplifier gain.

2. The structure set forth in claim 1 together with second multiplying means operating upon the compensation signal and a changeable DC bias signal for forming a second partial compensating signal connected to the post amplifiers which further achieves substantial diminution of variable shading due to the temperature difference between the aperture stop of the tracking system and a scene being viewed.

3. A compensating circuit as set forth in claim 2 together with means connected to the triangular and parabolic signals for summing them and forming a third partial compensation signal which biases the post amplifiers in a manner achieving substantial diminution of fixed shading caused by the vidicon and display.

4. The circuit set forth in claim 3 wherein the summing means also sums the second partial compensation signal thereby forming a composite compensation signal which biases the post amplifiers in a manner achieving substantial diminution of variable and fixed shading.

5. A circuit which compensates for display shading in an infrared tracking system, including a scanning mirror, signal post amplifiers, a vidicon and a CRT display, the circuit comprising:

amplifying means having its input connected to a signal source representative of tracking scanner position and generating a triangular signal therefrom;

integrating means connected at its input to the triangular signal for translating it to a parabolic signal;

rectifying means connected to the output of the integrating means for performing full wave rectification of the parabolic signal;

means connected at its inputs to the triangular and parabolic signals for summing the two and forming a compensation signal which biases the post amplifiers in a manner achieving substantial diminution of fixed shading caused by the vidicon and display.

6. A method of compensating for display shading in an infrared tracking system which includes a scanning mirror, signal post amplifiers, vidicon and a CRT display, the method comprising the steps:

generating a triangular shaped signal corresponding to the motion of the scanning mirror;

integrating the triangular signal to form a parabolic shaped signal;

rectifying the parabolic signal;

multiplying the triangular and rectified signals to form a resultant signal which biases the post amplifiers in a manner achieving substantial diminution of variable shading due to post amplifier gain; and affecting the aforementioned signal multiplication directly by the gain of the post amplifiers to achieve dynamic compensation.

7. The method set forth in claim 6 together with the step of further multiplying the result of the aforementioned signal multiplication with a changeable DC bias signal and connecting the resultant signal to the post amplifiers for also achieving substantial diminution of variable shading due to the temperature difference between the aperture stop of the tracking system and a scene being viewed.

8. The method set forth in claim 7 together with the step of summing the triangular and rectified signals and biasing the post amplifiers with the result therefrom thus achieving substantial diminution of fixed shading caused by the vidicon and display.

9. A method which compensates for the fixed display shading in an infrared tracking system due to the vidicon and camera components of the system, the method comprising the steps:

generating a triangular signal corresponding to the motion of a system scanning mirror;

integrating the triangular signal for translation to a parabolic signal;

rectifying the parabolic signal to form a full wave rectified parabolic signal;

summing the triangular and rectified signals; and biasing post amplifiers of the system with the summed signals.

* * * * *